Nov. 24, 1964      J. F. BABBITT      3,158,458
MULTI-PLEATED AIR FILTER
Filed March 6, 1961      4 Sheets-Sheet 1
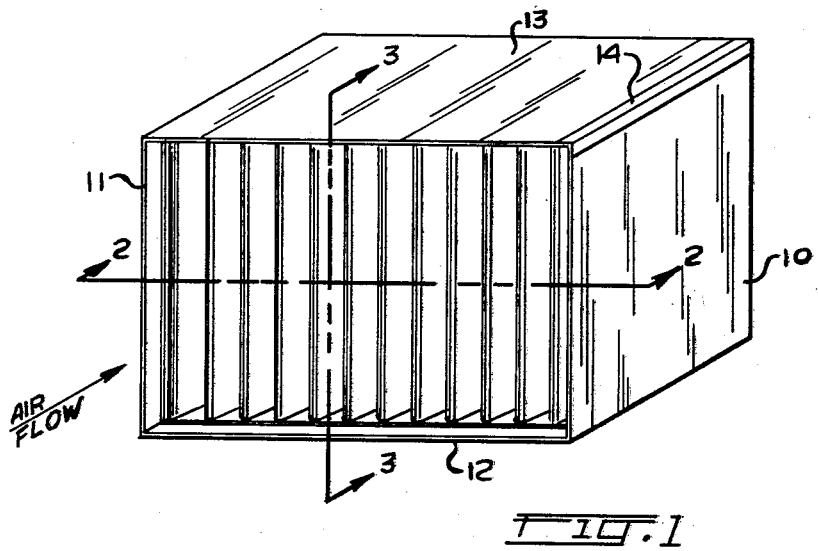
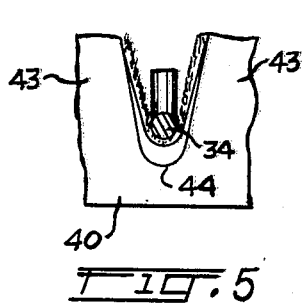
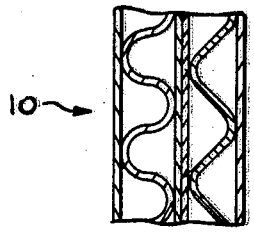
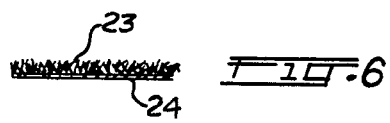
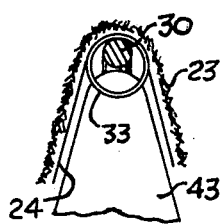
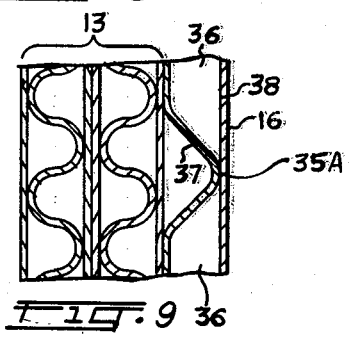
INVENTOR
JOHN F. BABBITT
BY  W. E. Sherwood
ATTORNEY

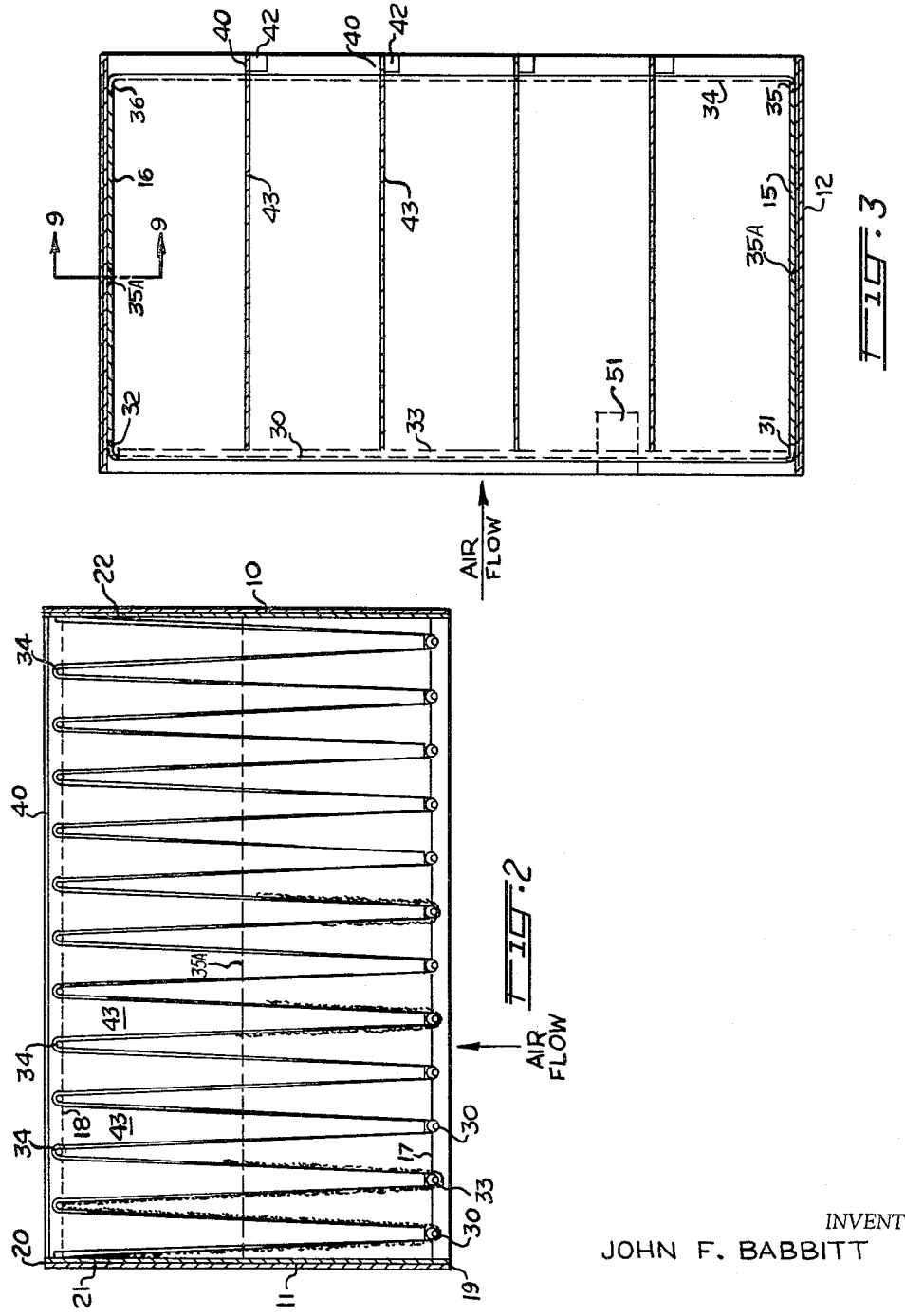

Nov. 24, 1964  J. F. BABBITT  3,158,458
MULTI-PLEATED AIR FILTER
Filed March 6, 1961  4 Sheets-Sheet 3
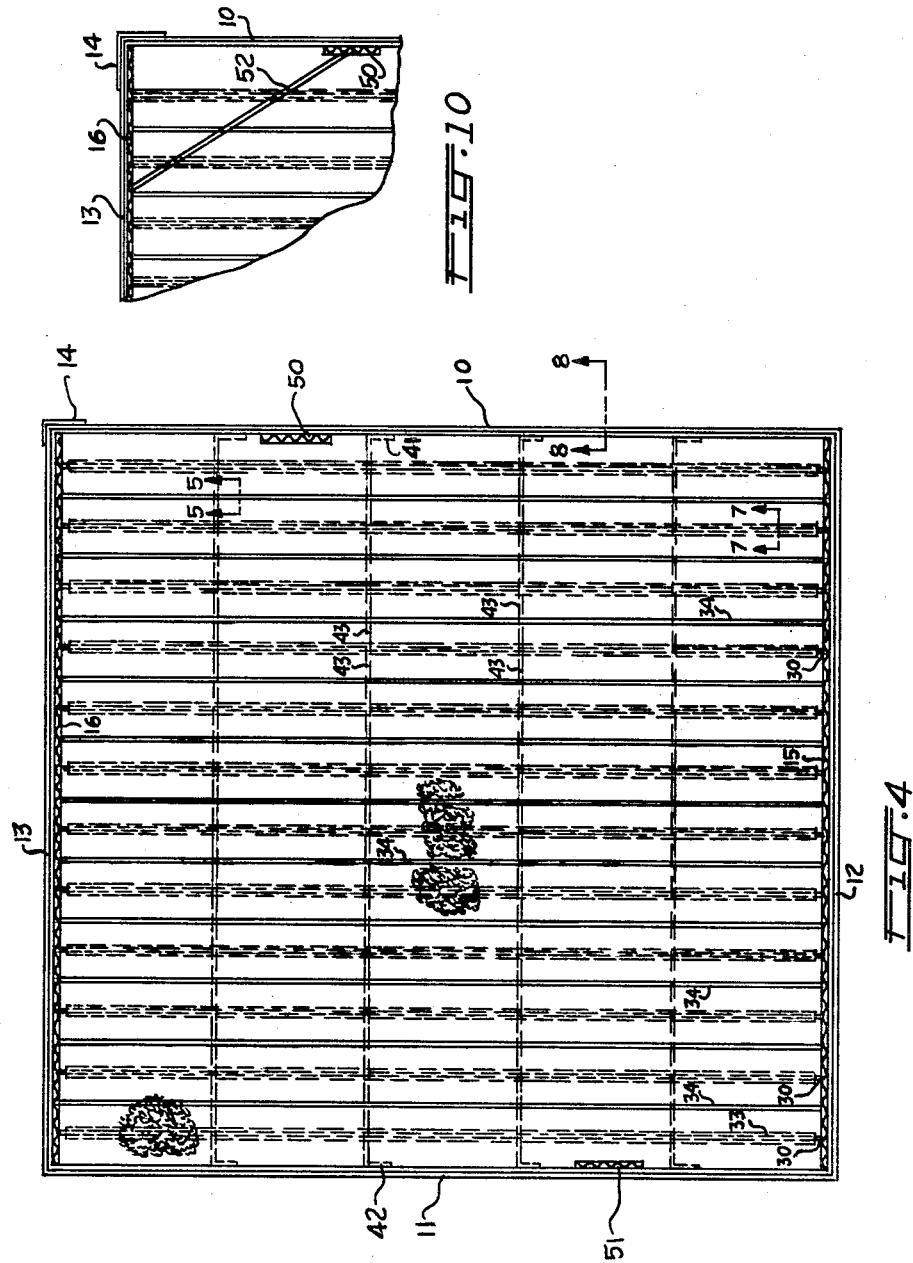
INVENTOR
JOHN F. BABBITT
BY  W. E. Sherwood
ATTORNEY Nov. 24, 1964   J. F. BABBITT   3,158,458
MULTI-PLEATED AIR FILTER
Filed March 6, 1961   4 Sheets-Sheet 4
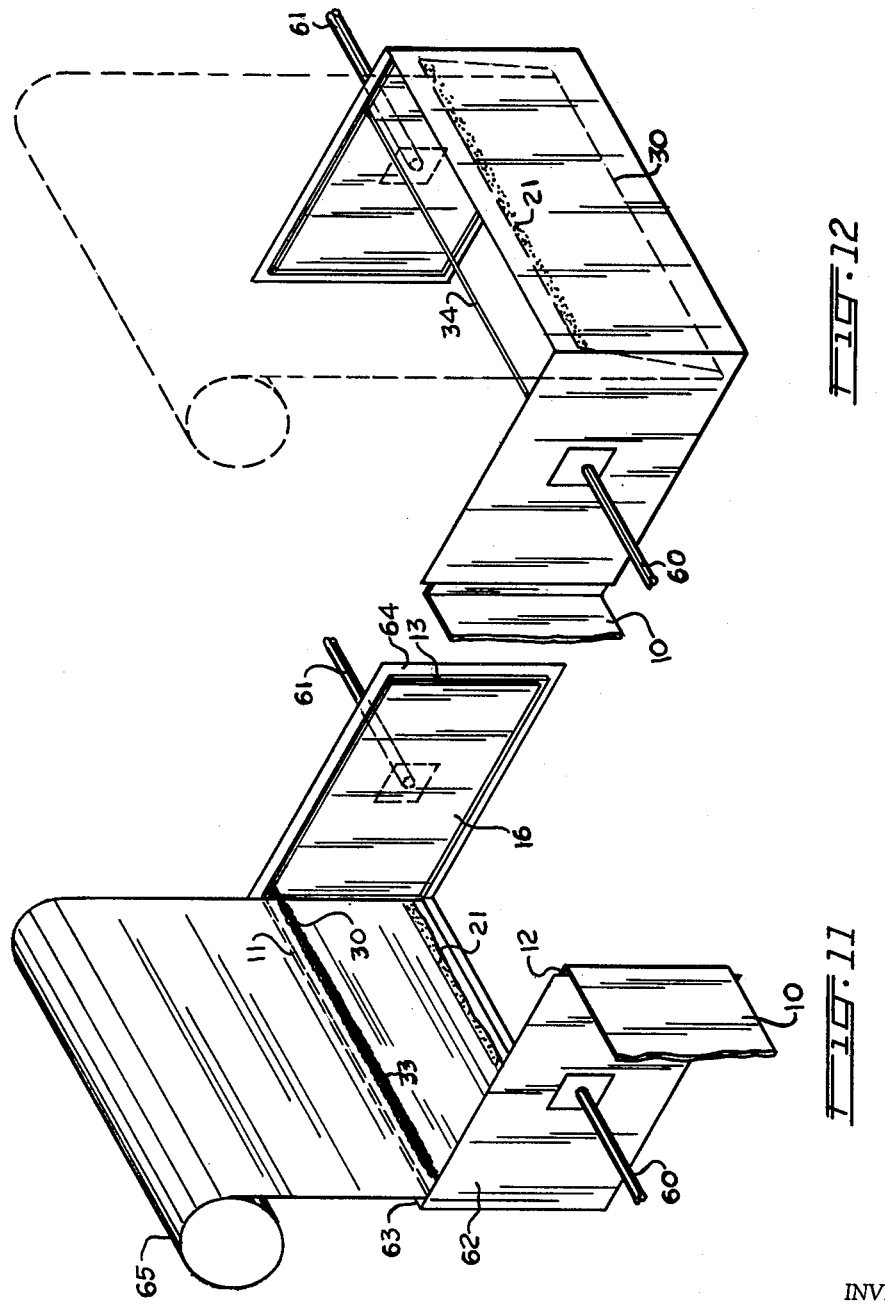
INVENTOR
JOHN F. BABBITT
BY W. E. Sherwood
ATTORNEY United States Patent Office 3,158,458
Patented Nov. 24, 1964

3,158,458
MULTI-PLEATED AIR FILTER
John F. Babbitt, Louisville, Ky., assignor to Continental Air Filters, Inc., Louisville, Ky., a corporation of Delaware
Filed Mar. 6, 1961, Ser. No. 93,626
1 Claim. (Cl. 55—499)

This invention relates to an improved air and gas filter. More particularly it relates to a high-efficiency type of multi-pleated filter so constructed that the entire filter may be regarded by the user as expendible after a single use.

In general, multi-pleated filters of this type heretofore have comprised structure which contains rigid parts of metal or other material in such an amount that the disposal of the entire filter after a single use cannot be justified economically. Frequently, such a filter comprises a rigid frame structure, which is reused and an expendible cartridge-like element which is expendible, these two parts being readily separable from each other. By contrast, the present invention includes the manufacture and use of a unitary filter structure in which no separability of the component parts after assembly thereof, is required.

An object of the invention is to provide an improved multi-pleated filter constructed of relatively inexpensive parts and characterized by a relatively high efficiency of filtering action.

A further object is to provide a unitary filter whose component parts after assembly are normally non-separable from each other.

Other objects and advantages of the invention will become apparent as the description proceeds and when considered in conjunction with the accompanying drawings in which;

FIG. 1 is a perspective view of the filter;
FIG. 2 is a partial sectional view taken horizontally on line 2—2 of FIG. 1 and to a larger scale;
FIG. 3 is a partial sectional view taken vertically on line 3—3 of FIG. 1 and to a larger scale;
FIG. 4 is a front elevational view of the upstream end of the filter;
FIG. 5 is a detail sectional view taken on line 5—5 of FIG. 4;
FIG. 6 is a detail sectional view of one form of filter medium suitable for use in the invention;
FIG. 7 is a detail sectional view taken on line 7—7 of FIG. 4;
FIG. 8 is a detail sectional view of a side wall of the frame taken on line 8—8 of FIG. 4;
FIG. 9 is a detail sectional view of a side wall of the frame taken on line 9—9 of FIG. 3;
FIG. 10 is a detail view showing an optional bracing of the filter;
FIG. 11 is a perspective view of a jig for assembling the filter and showing an initial step of the method of assembly; and
FIG. 12 is a view similar to FIG. 10 and showing a subsequent step of the method of assembly.

In accordance with the invention there is provided an open-ended, four-sided filter frame member formed of a relatively inexpensive material such as corrugated cardboard together with a sheet of flexible filter medium secured in pleated form within the frame. A first series of pleat-supporting members extending between opposite sides of the frame serve to support the pleated medium near the upstream end of the filter and a second series of such members extending between the same sides, but in a different plane, serve to support the pleated medium near the downstream end of the filter. In addition, a series of pleat-distending members extending between the other opposite sides of the frame and mounted on the filtered air side of the medium, serve to insure efficient distention of the medium during use of the filter. The pleat-supporting members and pleat-distending members likewise are formed of inexpensive materials to the end that the entire filter may be discarded after a single use without appreciable economic loss. The invention, moreover, provides an efficient method for readily assembling the filter by stretching the medium across the respective pleat-supporting members, followed by insertion of the pleat-distending member into position after the medium is affixed to the frame walls and looped across those supporting members.

Referring now to FIGS. 1 to 4, the frame member may conveniently comprise an elongated strip of corrugated cardboard, arranged in rectangular form to define a first pair of opposite side walls 10 and 11 and a second pair of opposite side walls 12 and 13, and with the adjoining edges of walls 10 and 13 being suitably fastened to each other as by an adhesive strip 14. As a feature of the invention, a supplemental panel preferably of corrugated cardboard with the corrugations disposed parallel to the direction of air flow through the filter, is mounted upon the inside surfaces of each of walls 12 and 13 as shown at 15 and 16. As best seen in FIG. 2, each of these panels has its upstream edge 17 and its downstream edge 18 disposed inboard of the extreme upstream and downstream edges 19 and 20 of the frame member, and for a purpose later to appear. The confronting surfaces of these panels preferably are smooth and may be coated with a conventional thermoplastic material adapted to soften and to provide a tacky surface when subjected to heat in the order of about 200° F. As further seen in FIG. 2, a flexible web of filter medium has one end 21 securely affixed to the side wall 11 adjacent the downstream edge of the frame and its other end 22 securely affixed to the side wall 10 at a corresponding location. This filter medium may take many forms without departing from the invention, but as seen in FIG. 6 it preferably comprises a fluffy filtering portion 23 of glass fibres, or the like, having relatively low tensile strength, and an air pervious but denser and thinner mat member 24 of a suitable flexible material having greater tensile strength and serving as a backing for the thicker portion of the medium. The mat member, moreover, is disposed on the filtered air side of the fluffy portion and serves to intercept small detached fragments of the fluffy material which otherwise might pass along with the filtered air or gas.

Considering now FIGS. 2, 3 and 4, the filter medium extending from its fastened end 21 is arranged over an elongated small diameter metallic rod 30 serving as one of a first series of pleat-supporting members. This rod is provided at its ends with integral extensions 31 and 32 fitting snugly in the spaces within the respective corrugated panels 15 and 16 at the upstream side of the frame. Surrounding the rod along substantially its entire length is a helically wound coil of metallic wire 33 having a coil diameter preferably about twice the diameter of the rod, as seen in FIG. 7. The filter medium is arranged with the mat member 24 thereof in contact with the wire coil. This coil serves a dual purpose in preventing the upstream apex sides of the pleats of the medium from contacting each other as air pressure is applied to the filter, and also serves as a roller which assists in arranging the web of medium in uniform pleats during the manufacture of the filter. The first series of rods 30 preferably are spaced equally from each other.

Similarly, a second series of rods 34 having integral extensions 35 and 36 at their ends are fitted snugly in the spaces within the respective corrugated panels 15 and 16, at the downstream side of these panels but with those extensions facing toward the corresponding extensions of the first mentioned rods 30. Normally, no coil is needed with respect to rods 34, although a coil similar to that shown at 33 may be used without departing from the invention, if so desired.

The width of the web of filter medium is at least equal to the distance between the confronting surfaces or panels 15 and 16 and preferably is slightly greater, for example, about one-half inch, for insuring a secure sealing of the side edges of the pleats. However, since this web does not extend across the spaces in the corrugated portion of those panels, a by-passing of air or gas therethrough would normally occur in the absence of means for preventing the same. One simple solution to this problem is shown in FIGS. 2, 3 and 9 and may comprise a compacted band 35A extending transversely across a central region of each of panels 15 and 16 and wherein the interior undulating spacer 36 and one wall 37 of the panel is crushed against the other wall 38 to provide a barrier to air flowing through the panel of the filter. As seen in each of FIGS. 8 and 9, the corrugated cardboard walls such as 10 and 13 have the spaces between their internal spacers arranged in a plane normal to the flow of air through the filter and thus prevent air flow through said walls. It will be understood that the cardboard strip forming the frame may be either of the one-side or two-side types of conventional corrugated board and that it will preferably be of two-ply formation being bent upon itself, as indicated in FIG. 3. The corrugated cardboard forming the panels, however, is of one-ply formation, but may comprise either one-side or two-side types of such cardboard. In addition, as seen in FIG. 4, short pieces of cardboard, such as that forming the panels, are preferably affixed to the walls 10 and 11 as shown at 50 and 51 near the upstream edge of the filter and with their spaces extending parallel to the spaces in the panels.

Considering now FIGS. 2, 3 and 5, the web upon being assembled within the frame and looped upon the described rods, is then suitably distended on its filtered air side by contact with a series of pleat-distending members. These members may comprise solid cardboard material having a base strip 40 with integral extensions 41 and 42 adapted to be adhesively secured to the side walls 10 and 11 respectively in the region between the downstream edges 18 and 20 of the respective panels and frame walls. Each of the pleat-distending members includes generally triangular fingers 43, the apices of which extend into close proximity to the underside of the wire coil surrounding the rod 30 and thus prevent the adjacent sides of the pleat of medium looped over that rod from being forced into contact with each other as air pressure is applied to the filter. It will be understood that the wire coil 33 with its relatively large diameter also cooperates in this action, which contributes materially to the high efficiency behavior of the filter.

The size of the fingers of the pleat-distending members and the arrangement of the respective first and second series of pleat supporting rods are so related as to provide a larger volumetric space within the filter on the unfiltered air side of the filter web than on the filtered air side thereof. This relationship, moreover, is aided by having the space between the bases of adjacent fingers formed with a deepened curve 44, as seen in FIG. 5, so that the rearward apex of the pleat may bulge farther rearwardly when air pressure upon a web loaded with dirt so dictates. Thus any distortion of the pleat which might otherwise reduce its filtering surface by being pushed against the side surfaces of the pleat-distending members, is avoided, and a further contribution to the high-efficiency filtering action is secured.

It will be understood that the filter embodying the invention will be inserted into and removed from a stationary duct (not shown) through which the air or other gas being filtered, will pass. The exterior dimensions of the filter will be such as to fit snugly within that duct or other support for receiving the filter, and on occasion it may be desirable to increase the rigidity of the filter for handling, or for shipping the same. This increased rigidity may be readily and inexpensively secured by providing supplementary bracing members comprising rigid diagonal rods, one of which is seen at 52 in FIG. 10. Such rods are provided with integral ends adapted to fit within the spaces in the respective panel 16 and short piece 50 of corrugated material, a similar such rod being used as desired between the other panel 15 and the other corrugated piece 51.

Referring now to FIGS. 11 and 12, the described filter may be manufactured in a simple and rapid manner by providing a three sided jig mounted for oscillatory movement upon shafts 60 and 61, as now to be described. At the start of operation the strip of corrugated cardboard serving as the filter frame will be arranged with its first side 10 bent backwardly to one side of the jig and with its second side 12 resting in contact with the side wall 62 of the jig. The third side 11 of the strip rests against the back wall 63 of the jig; the fourth side 13 of the strip rests against the side wall 64 of the jig; the juxtaposed panels 15 and 16 are in place upon the respective second and fourth sides of the strip; and a supply roll 65 of a web of filter medium is disposed above the jig.

The operator then attaches the end 21 of the web to the third side 11 of the strip adjacent the lower edge thereof, and then, forwardly of the plane of the attached web, inserts the first of the series of rods 30 with its wire coil in place upon the same, into the spaces of the corrugated panels. Thereafter, the jig is inverted into the position as shown in FIG. 12, and the web is thus pulled over the wire coil under tension. The first of the series of rods 34 is then inserted into the panels and the jig is restored into its starting position thus looping the web over that rod 34 and the described action is then continued until the requisite number of pleats is formed. At this time the first side 10 of the frame member is bent into place and the strip 14 is affixed to the adjoining edges of sides 10 and 13. The web is then severed along end 22 and this severed end is affixed to the first side 10 of the frame along the lower edge thereof.

Any suitable and conventional adhesive material compatible with the cardboad nature of the frame and with the material forming the filter medium, may be used to secure each of the ends 21 and 22 of the web in place and preferably such adhesive material after once setting will still maintain its grip upon the medium even when heated above 200° F. As will be noted, the filter medium web is looped alternately over rods 34 which serve to snub longitudinal movement of the web and over the wire coils 33 which serve to permit longitudinal movement thereof. The web accordingly is substantially uniformly tensioned over its entire length and the securing of the end 22 of that web requires no final tightening of the web along its entire length.

Various procedures may be employed to secure the pleat edges to the surfaces of panels 15 and 16. In one preferred arrangement, these surfaces may be precoated with a conventional thermoplastic material which upon being raised to a temperature of about 200° F. will become tacky and adhere to the strands of the filter medium in contact therewith, and which upon being cooled will set and hold those strands in place. The width of the filter medium is such as to dispose about ¼ inch of the web in close contact with each of these coated panels.

In another procedure, the operator may draw a brush or the like, having a flowable adhesive thereon, along the edges of each pleat in contact with the panels and thus secure the pleat edges to the panels.

In either event, after the pleat edges are attached to the panels, the pleat-distending members are then emplaced and secured to the sides 10 and 11 by means of the projections 41 and 42. If reinforcement for the completed filter is considered desirable, the supplementary rods 52 may then be inserted and the filter may be stored or installed, or shipped.

Having thus described the filter and a method for making the same, the several advantages of the invention will now be apparent. All of the component parts are relatively inexpensive and contribute to the expendible nature of the filter. These parts when assembled, serve to define a unitary filter having high-efficiency for filtering, particularly since the collapsing of pleat surfaces against each other is avoided. Moreover, the filter may be rapidly constructed using unskilled labor and inexpensive equipment.

With the foregoing description of the invention and its attendant advantages in mind, it is intended that the appended claim is to cover such changes and modifications of the described invention as come within the true spirit and scope of the same.

What is claimed is:

A multi-pleated air filter having in combination an open-ended rectangular frame including first and second pairs of opposite side walls, a pair of panels of corrugated material affixed to the respective interior surfaces of each of said second pair of side walls and having spaces therein extending generally parallel to the direction of air flow through said filter, a filter medium comprising a flexible sheet arranged in multiple pleated formation with its respective ends secured to the respective first pair of side walls and its respective side edges secured to the respective panels, a first series of pleat-supporting rods extending between said panels and with their ends engaged in the spaces of the respective panels adjacent the upstream end of the filter, roller-like members comprising wire wound in helical form and rotatably surrounding the central portions of a plurality of said first series of rods and having a diameter greater than the rod diameter and with said filter medium being looped over said roller-like members, a second series of pleat-supporting rods having the filter medium looped thereover, said second series of rods extending between said panels and with their ends engaged in the spaces of the respective panels adjacent the downstream end of said filter, and a plurality of non-metallic pleat-distending members having portions in contact with the respective pleats on the filtered air side thereof, each of said supporting rods being mounted separately from each other and from said distending members, and each of said distending members being spaced from each other and being separately attached to the interior surfaces of said first pair of side walls.

References Cited by the Examiner

UNITED STATES PATENTS

| | | | |
|---|---|---|---|
| 1,049,789 | 1/13 | Williamson | 55—506 X |
| 2,080,154 | 5/37 | Strindberg | 55—502 X |
| 2,364,573 | 12/44 | Vokes | 55—502 X |
| 2,907,407 | 10/59 | Engle et al. | 55—500 |
| 2,907,408 | 10/59 | Engle et al. | 55—500 |
| 2,943,700 | 7/60 | Bub | 55—521 X |
| 3,138,443 | 6/64 | Engle et al. | 55—499 |

FOREIGN PATENTS

| | | |
|---|---|---|
| 750,099 | 6/56 | Great Britain. |
| 847,726 | 9/60 | Great Britain. |

GEORGE D. MITCHELL, *Primary Examiner.*

WALTER BERLOWITZ, HARRY B. THORNTON, REUBEN FRIEDMAN, *Examiners.*